United States Patent
Rock

[19]

[11] Patent Number: 6,121,693
[45] Date of Patent: Sep. 19, 2000

[54] DISTRIBUTED POWER SYSTEM

[75] Inventor: Agnes G. Rock, Sunnyvale, Calif.

[73] Assignee: Cisco Technology, Inc., San Jose, Calif.

[21] Appl. No.: 09/137,158

[22] Filed: Aug. 20, 1998

[51] Int. Cl.[7] .................................................. H02J 1/10
[52] U.S. Cl. ............................................. 307/18; 307/39
[58] Field of Search ............................... 307/18, 23, 29, 307/31, 39, 44, 147; 361/94–98, 78–79, 83

[56] References Cited

U.S. PATENT DOCUMENTS

| | | |
|---|---|---|
| 4,035,715 | 7/1977 | Wyman et al. . |
| 4,257,090 | 3/1981 | Kroger et al. . |
| 4,618,779 | 10/1986 | Wiscombe . |
| 4,727,292 | 2/1988 | Miller . |
| 4,734,844 | 3/1988 | Rhodes . |
| 4,766,364 | 8/1988 | Biamonte . |
| 4,866,295 | 9/1989 | Leventis et al. . |
| 4,878,034 | 10/1989 | Gross et al. ............................... 361/98 |
| 4,924,170 | 5/1990 | Henze . |
| 5,053,637 | 10/1991 | Dillard . |
| 5,122,726 | 6/1992 | Elliot et al. . |
| 5,477,132 | 12/1995 | Canter et al. . |
| 5,521,809 | 5/1996 | Ashley et al. . |
| 5,552,643 | 9/1996 | Morgan et al. . |
| 5,752,047 | 5/1998 | Darty et al. . |
| 5,774,736 | 6/1988 | Wright . |
| 5,798,578 | 8/1998 | Thereze ..................................... 307/18 |
| 5,892,299 | 4/1999 | Siewert et al. ........................... 307/85 |

*Primary Examiner*—Josie Ballato
*Attorney, Agent, or Firm*—Jay A. Chesavage

[57] ABSTRACT

A power supply distribution comprises equipment having a shared power bus. Supply isolators isolate the supply from the shared power bus in the event of a power supply output short circuit. Load isolators isolate the supply from other loads that may short circuit, or consume excess output current. Memory and isolators are used to detect and store the occurrence of load or supply failures, and memory may be of revertive or non-revertive type.

14 Claims, 5 Drawing Sheets

Output characteristics of Fig. 2 and Fig. 5

—·——·— Plot 112: Memory output versus time for Figure 4
——————— Plot 110: Io versus time for Figure 4

DISTRIBUTED POWER SYSTEM

FIELD OF THE INVENTION

This invention is directed to the class of redundantly operating power supplies found in applications requiring very high reliability, such as networking equipment. In this class of equipment, the failure of a load, or the failure of a power supply, or the loss of mains power to one or more of such supplies should not cause any disturbance in the operation of the equipment receiving power. This continued operation in the presence of load and supply failures allows a high availability of use in the presence of multiple faults.

BACKGROUND OF THE INVENTION

Redundant power supplies are used in networking equipment to increase the overall reliability of the associated network. This improvement in reliability is available through several mechanisms. The first mechanism is the automatic isolation of failed power supply elements and load elements from the power source. The power source comprises a plurality of individual power supplies, each capable of isolation from the other supplies. The load comprises a plurality of individual loads, each capable of isolation from the other loads. The combination of supply isolation, load isolation, and isolation control means provides a system with composite reliability improved over prior art apparatus and methods.

The prior art for current sharing power supplies is extensive. This prior art in the area of redundant current sharing power supplies falls into three general areas: droop sharing power supplies, 3 wire control power supplies, and local sensing power supplies. The first area pertains to droop sharing power supplies, as in U.S. Pat. No. 4,924,170 (Henze) wherein the output impedance of the supply is used to share load current. Disclosed in this patent is local feedback of output current as a term which has the overall effect of increasing the output impedance of the supply for DC, while maintaining a low output impedance at higher frequencies. An example of droop sharing with the use of non-linear feedback for improved droop range is Chesavage U.S. Pat. No. 5,834,925. The second area is 3 wire control power supplies, wherein the output of a high gain error amplifier is fed commonly to low gain output stages to produce an common output, which requires sharing of internal signals in addition to the usual combined outputs. One example of this is U.S. Pat. No. 4,734,844 (Rhoads et al) which describes a 3 wire regulation system wherein a master supply generates a control output, and a plurality of slave units act on this common control signal. This system is has the weakness that if one of the supplies contaminates the common control signal with erroneous input, the entire system will replicate and produce an erroneous output. Rhoads does not address redundancy in the sense of immunity to component failure, but shows additional interconnections between supplies for them to work properly. U.S. Pat. No. 5,521,809 (Ashley et al) discloses a current sharing circuit based on the power supplies exchanging information with each other relating to the level of current sharing through a separate bus wire, identified in the patent as a sharebus. Each power supply has a local estimate of current being delivered, which is compared with a fraction of the total current, and a local feedback term is provided to each supply to achieve current sharing. This method affords a high degree of accuracy in current sharing, but does not address either on-line redundancy or transient behavior.

A related method combining aspects of the first and third class of sharing is shown in U.S. Pat. No. 4,618,779 (Wiscombe) which describes a scheme for regulating a plurality of power supplies by modulating the value of the sense resistor in the feedback loop via an external controller which modulates this value based on sensing current delivered by each supply to the load.

The third area is local sensing power supplies, in which a locally sensed version of the output signal is compared with the total output current, and the local error signal represents a combination of output error signal and current sharing error. U.S. Pat. No. 4,035,715 (Wyman et al) describes a current sharing system wherein the total system output current is made available to each supply so as to ensure that each supply does not furnish more than its proportion of total load current. U.S. Pat. No. 5,552,643 (Morgan et al) describes a method of current summing wherein multiple switch mode power supplies deliver current to a common inductor. This addresses a method of current summing, but does not afford redundant operation. U.S. Pat. No. 4,257,090 (Kroger et al) describes a current sharing system wherein feedback is provided to each power supply based on the sum of the output voltage and a local measurement of inductor current, which ensures that each power supply is operating below the maximum current as constrained by a saturated output inductor. U.S. Pat. No. 5,477,132 (Canter et al) is similar to Ashley, and discloses means for measuring a total current, and delivering this measurement to the individual power supplies, which compare this total value to their individual contribution, and produce a local error term which is summed into the regulation loop along with the global (output) voltage regulation term. U.S. Pat. No. 4,866,295 (Leventis et al) describes another technique for current sharing based on measurement of output current from each supply being subtracted from a total measured output, similar to that described by Canter and Ashley. U.S. Pat. No. 4,766,364 (Biamonte et al) discloses a redundant power supply having a common output filter and distributed diode and inductor energy storage circuits. In this master/slave configuration, the master power supply computes an error signal that is distributed to the slave units. Each power supply further has decision circuitry to take that unit off-line if there appears to be a failure in that unit. A master error causes each slave supply to furnish its own local error signal and ignore the master signal.

The prior art for distributed power systems includes load isolation of U.S. Pat. No. 5,053,637 by Dillard, which shows distribution of power to a plurality of loads, each having overcurrent protection, however, no means of current sharing is shown.

Paralleling of power sources is disclosed in U.S. Pat. No. 5,774,736 by Wright et al where power sources operate in parallel, and additional independent sources are connected in parallel if the output voltage requirements are identical. The condition of shorted outputs in power supplies is not discussed.

Removal of power supplies in the event of failure is discussed in U.S. Pat. No. 5,122,726 by Elliott et al. In this patent, a power fault monitor in the power supply activates a fault signal which takes the power supply off line. The isolation element used is a diode, rather than an active switch element.

Switch based isolation elements are discussed in Darty et al in U.S. Pat. No. 5,752,047. A Solid State Power Controller (SSPC) is controlled by a microprocessor, which is examining the level of output current drawn by a load.

SUMMARY OF THE INVENTION

The present invention provides for improved reliability of systems producing and consuming power through the use of a shared power bus fed from a plurality of power supplies, each power supply coupled to the shared power bus through an optional supply isolator, each optional supply isolator having a control input responsive to a failure in the power supply to which it is coupled. Further coupled to this shared power bus are a plurality of load isolator, each load isolator thereafter coupled to a power load, and each load isolator responsive to a failure in the load to which it is coupled. Typically, the plurality of power supplies comprise current sharing power supplies, the supply isolator comprises a controllable low-loss switch means such as a low resistance Field Effect Transistor (FET), and the load comprises electronic equipment receiving such power. The control means for this power supply isolator comprises a fault detection circuit measuring a power supply parameter. The plurality of power loads comprises the actual electronic equipment being operated, and the control input for each load isolators comprises a fault detection circuit measuring a load parameter. Therefore, a first object of the invention is a power distribution system which detects and isolates power supply failures. A second object of the invention is a power distribution system which detects and isolates load failures. A third object of the invention is a power distribution system which allows additional power supplies and loads to be incrementally added or removed while providing enhanced and improved reliability of operation. A fourth object of the invention is a power distribution system which provides n-way redundancy without the need for n−1 additional power supplies which are used for no other purpose.

DETAILED DESCRIPTION OF THE INVENTION

Reliable power distribution requires that failed elements be removed from the circuit when the failure is first detected. These failed elements may comprise power supplies, which are capable of shorting a shared power bus, or power loads, which are also capable of shorting a shared power bus. In addition, a hot-swap configurable system can have additional power sources or loads being dynamically added or removed during system operation. The present invention enables such dynamic reconfiguration and operation through supply and load isolators and control means for these isolators.

Figure 1:
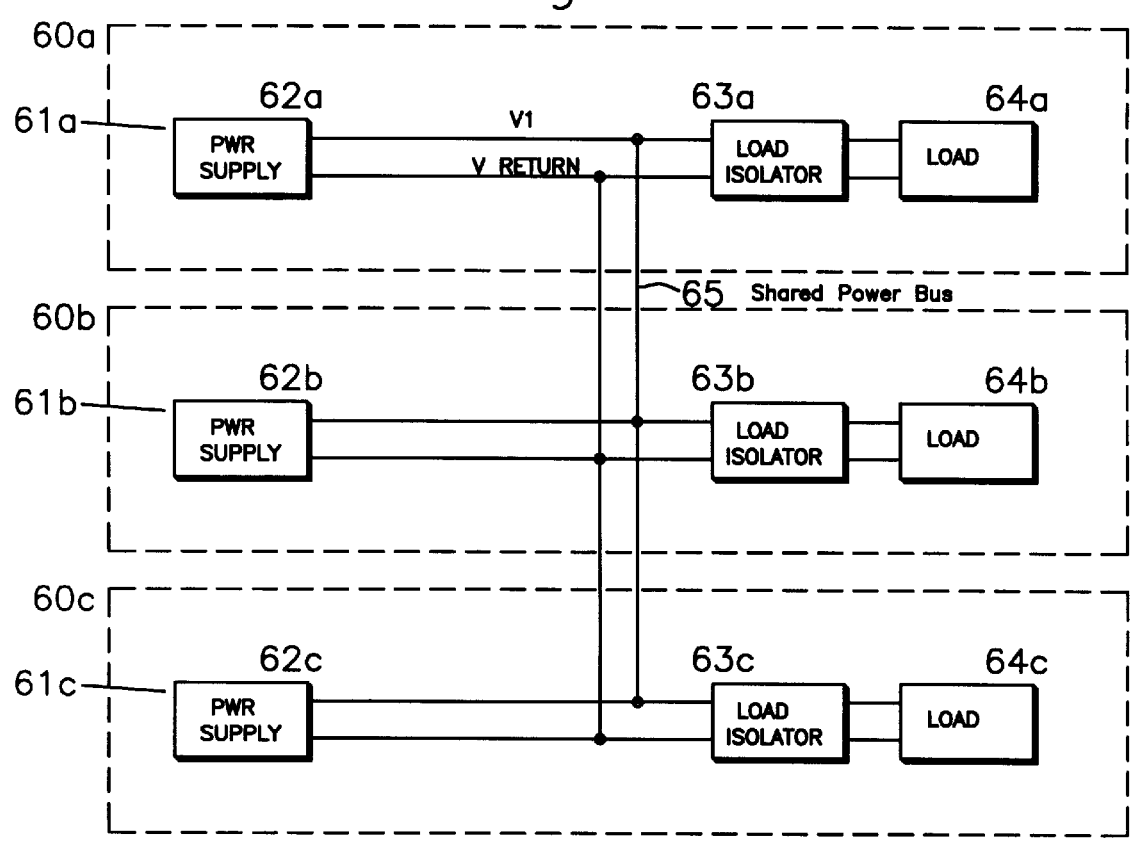
FIG. 1 shows the present invention with a load isolator.

FIG. 1 shows one embodiment of the present invention. Powered equipment 60a, 60b, and 60c comprise individually operable networking equipment, such as the well known components of ISO layer 2 switches or layer 3 routers. These are devices which can be interconnected in meshes which can tolerate link outages, as would be the case if one such router or switch comprised the load 64a, 64b, or 64c. In prior art configurations, each powered equipment 60a, 62b, and 62c comprises power supplies 62a, 62b, 62c, and power loads 64a, 64b, and 64c. Load isolator 63a may comprise a fuse, and there is no shared power bus 65 which is external to the powered equipment. In the present invention, current sharing power supplies 62a, 62b, and 62c are linked together through an external and expandable shared power bus 65. The function of these current sharing power supplies is to enable the continued delivery of current to all loads, even if one such supply were to stop delivering current.

General reliability of systems fall into two classes: series systems and parallel systems. Given a series system comprising two elements with failure rates respectively of $\lambda 1$ and $\lambda 2$ the respective reliabilities $R_1$ and $R_2$ may be may be computed as $$R_1 = \exp(-\lambda_1 t),$$

and $$R_2 = \exp(-\lambda_2 t)$$

where $R_1$ and $R_2$ are the system reliabilities associated with failure rates $\lambda_1$ and $\lambda_2$.

The total reliability rate for the series system $RT=R1*R2$.

MTBF, or Mean Time Before Failure, is defined as $1/\lambda$.

For the case where the failure rate for a power supply is known to be $\lambda_1=10/10^6$ hours, the reliability over $10^6$ hours is $$R\text{supply} = \exp(-10) = 4.54 \times 10^{-5,}$$

while for the isolator the failure rate $\lambda 2=0.1/10^6$ hours and the related reliability over $10^6$ hours is $$R\text{isolator} = \exp(-0.1) = 0.905$$

In the case where two such components are placed in series, the reliability decreases to $$R\text{isolator+supply} = (4.54 \times 10^{-5})(0.905) = 4.11 \times 10{-5},$$

corresponding to a failure rate of 10.1 every $10^6$ hours, and we can see that the incremental decrease in reliability (from 10 to 10.1 in $10^6$) by adding a comparatively reliable isolator is small. The related MTBF values are as follows:

$$MTBF_{supply} = 100,000 \text{ hours}$$

$$MTBF_{isolator+supply} = 99,010 \text{ hours}$$

For 2-unit redundant systems the MTBF is found to be $3/2\lambda$, while for 3-way redundant systems, the MTBF is found to be $11/6\lambda$. For repairable systems reporting power supply failure status, it is rarely necessary to use more than 3 power supplies in such a configuration.

If we were to use two such isolator+supply combinations and put them in parallel, we would find $$MTBF(2 \times \text{ isolator+supply}) = (3/2)99,010 = 148,515 \text{ hours.}$$

This improvement increases dramatically when system reporting of power supply failures is taken into account, and the failed power supply is replaced before a final power supply failure occurs.

Figure 2:
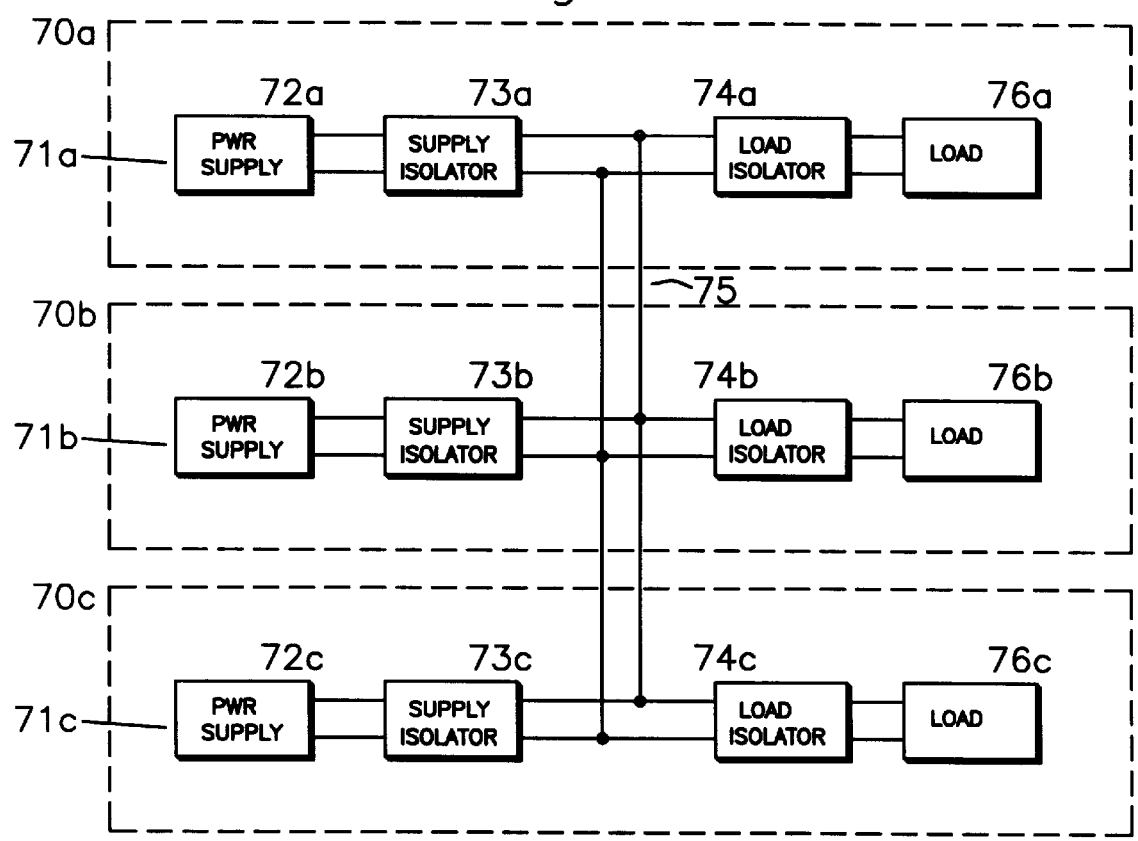
FIG. 2 shows the present invention with both supply isolators and load isolators.

FIG. 2 is similar to FIG. 1, with the addition of supply isolator 73a, 73b, and 73c. In this configuration, if power supply 72a became shorted with supplies 72b and 72c continuing to operate, power supply isolator 73a would remove supply 72a from the shared bus 75, while supply isolators 73b and 73c would permit the continued delivery of power to shared bus 75 by power supplies 72b and 72c. Similarly, the shared bus 75 would allow the delivery of power to loads 76a, 76b, and 76c until a load short occurred. If, for example, a load short occurred in 76a, while loads 76b and 76c were to continue to operate normally, load isolator 74a would open, while load isolators 74b and 74c would continue to be closed, allowing power from the shared bus 75 to be delivered to normally operating loads 75b and 75c.

Figure 3:
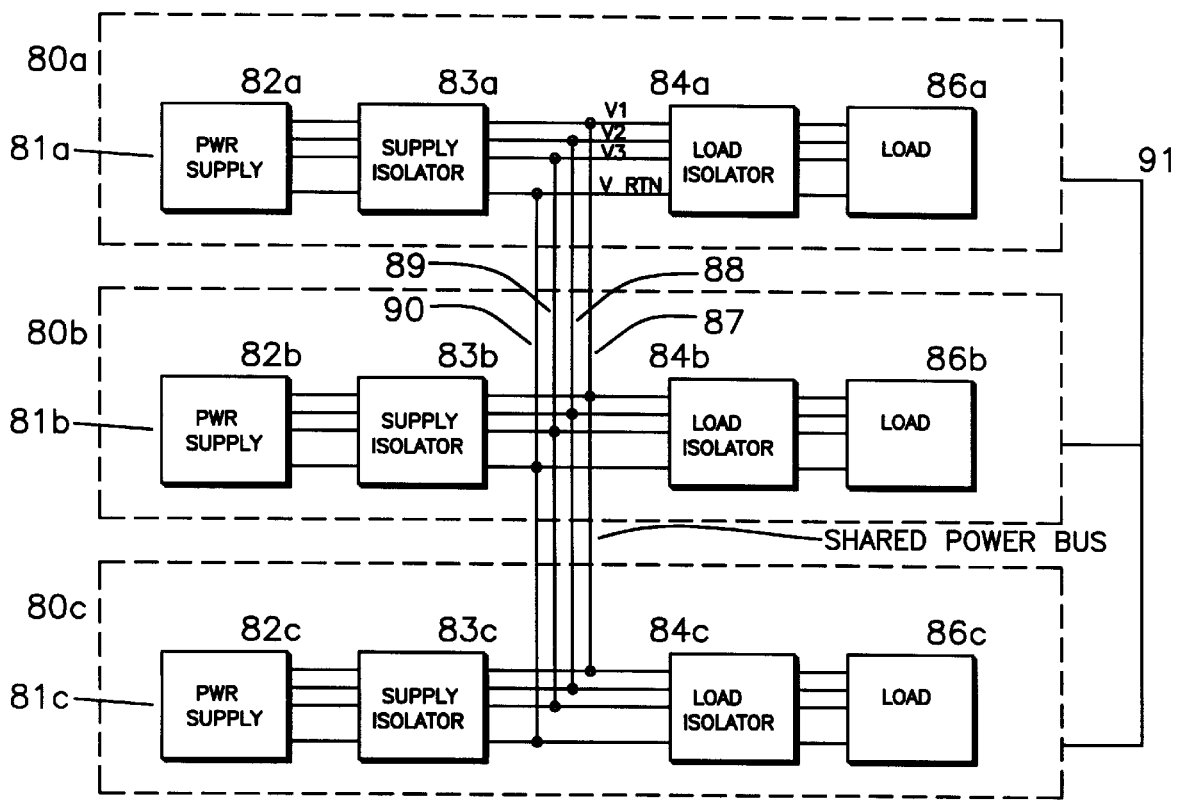
FIG. 3 shows the present invention with supply isolators and load isolators, where the power supply has multiple outputs.

FIG. 3 shows the configuration of FIG. 2 with multiple output voltages. For the case where the shared power bus comprises voltages V1 87, V2 88, and V3 89, and a common return 90, a short circuit failure in one of the power supply outputs of supply 82a could be individually isolated with isolator 83a, or the entire power supply could be isolated. In either case, the isolation decision would be made locally utilizing the information available in power supply 82a. An analogous load isolation scheme for multiple voltages is achieved with load isolators 84a, 84b, and 84c. Each load isolator comprises a plurality of individual isolators, which may operate independently, or together. As is clear to one skilled in the art, supplies 82a, 82b, 82c, and supply isolators 83a, 83b, and 83c could be providing similar levels of output power and making isolation decisions based on identical criteria, or they could be providing currents of differing magnitudes and utilizing independent isolation criteria. Each supply isolator pair 83a and 84a, 83b and 84b, and 83c and 84c are components of a single powered equipment 80a, 80b, and 80c, so the isolator decision is made exclusive of information available in the other units. In another embodiment, optional control bus 91 could be used to coordinate information about on-line availability of different isolators.

Figure 4:
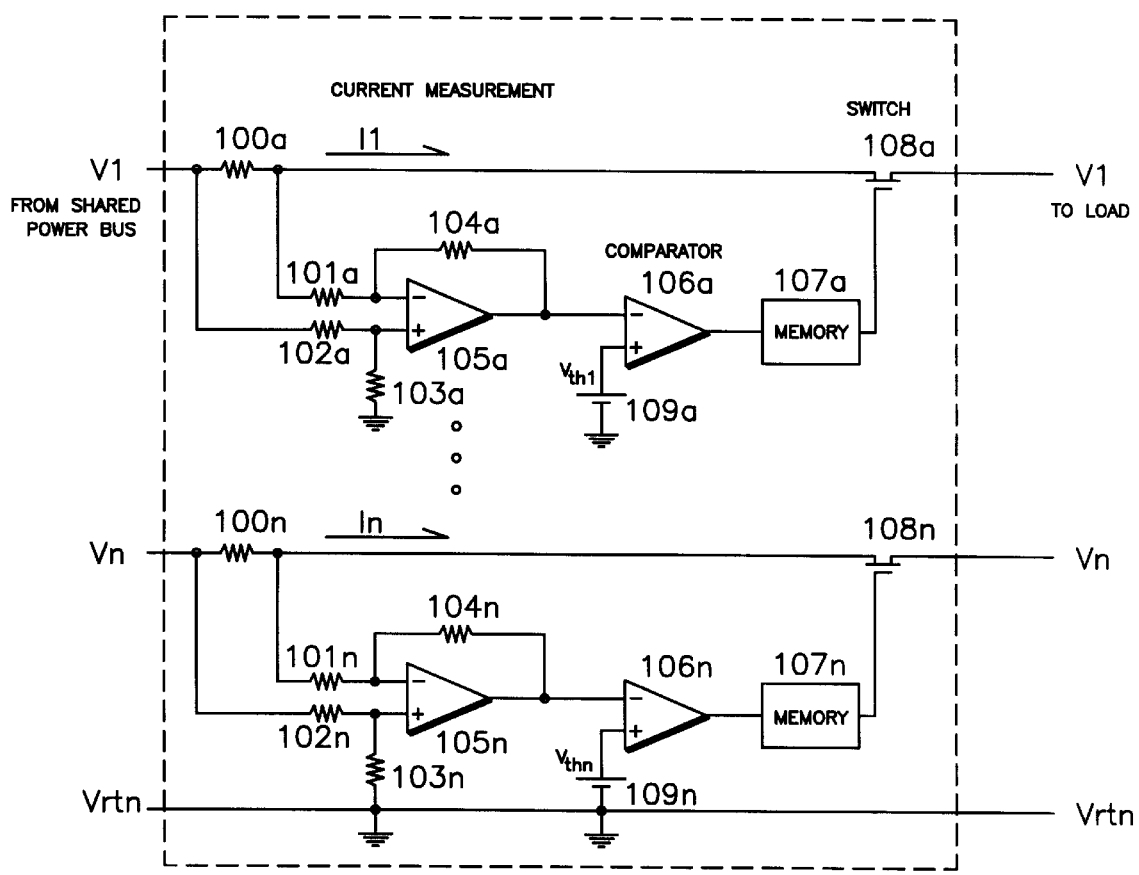
FIG. 4 shows a detailed schematic of the load isolator elements of FIGS. 1, 2, and 3.

FIG. 4 shows the schematic for one possible load isolator. For a single output power supply load isolation such as 63a or 74a, only elements 100a through 109a would be present. For the case of a multiple output shared power bus, additional isolator elements a through n are shown in FIG. 4. Examining in detail one such load isolator, current shunt 100a produces a voltage proportional to load current I1 drawn by load 86a. This voltage is applied to the differential amplifier comprising balanced resistors 101a, 102a, 103a, 104a, and operational amplifier 105a. The output of this amplifier 105a is proportional to the load current passing through resistor 100a, and is then applied to comparator 106a. This amplifier output 105a, which is proportional to the load current is compared with threshold voltage 109a by comparator 106a and stored by memory element 107a. If the load current exceeds the threshold set by 109a, the output drive to switch FET 108a is removed, thereby isolating the faulty load from the input, and allowing other loads sharing this voltage to continue operating without interruption. Other features of the memory element 107a may include disabling the isolation after a period of time, reporting of errors to a system CPU for reporting of a maintenance need, or reapplication of voltage after a period of time. Additionally, the threshold may be dynamically adjusted up or down depending on various load and power supply conditions. For example, it may be useful to temporarily increase the threshold upon the initial application of power. It is clear to one skilled in the art that many alternate methods are available for the measurement of current, such as saturable core inductors, hall effect devices, and the like. Similarly, there are many comparison and memory means available, including threshold comparators using comparator Ics such as the Motorola LM339, and many different memory elements are available, such as a one-shot timer. Further, while the FIGS. 1–3 show 3 way redundancy, the disclosure of the present invention would work equally well for any combination of two or more powered equipment. It is clear to one skilled in the art that these elements may be changed as described above without changing the nature of function of the invention as described herein.

Figure 5:
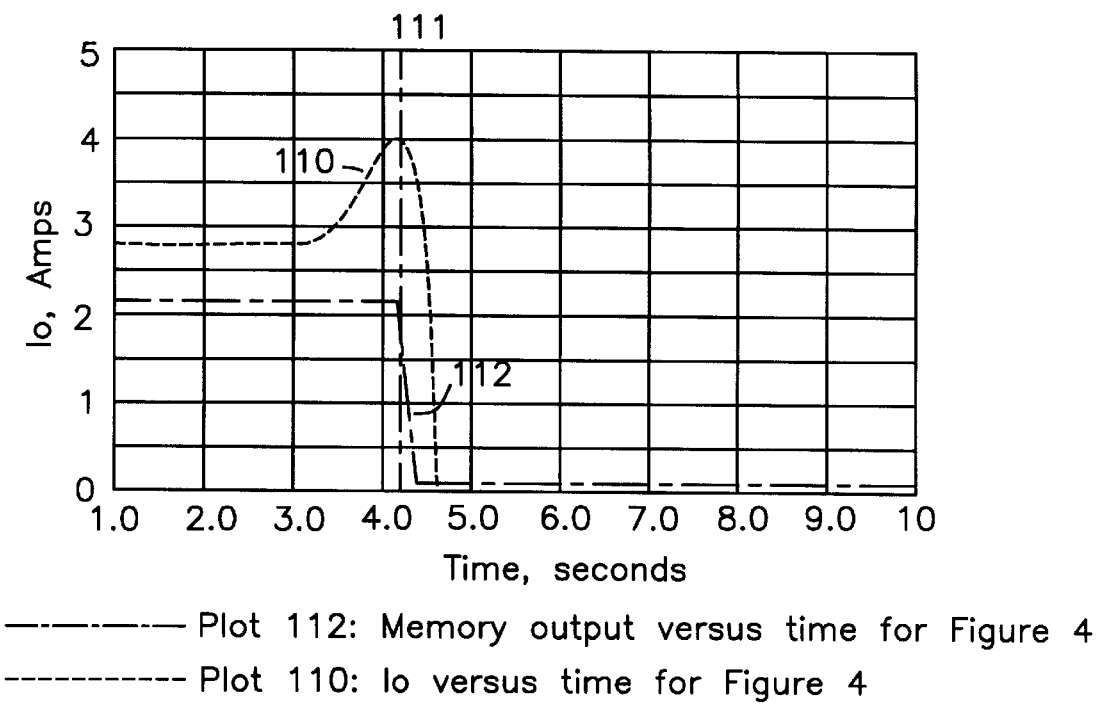
FIG. 5 shows the output characteristics of the load isolator operating in the presence of a load fault.

FIG. 5 shows the output characteristic of the circuit of FIG. 4. Curve 110 represents the output current versus time. From time 0 to roughly 4.2 seconds approximated by limit line 111, the output current increases to a threshold value of 4 amps. The threshold 109a of the load isolator 84 is set for this threshold, and disables power to the output load, as shown by curve 112.

I claim:

1. A power distribution apparatus comprising:
   a shared power bus;
   a first plurality of current sharing power supplies, each supply coupled to said shared power bus;
   a second plurality of powered equipment, each of said powered equipment comprising:
      a load;
      a load isolator having an isolator input coupled to said shared power bus, and an isolator output coupled to said load,
   said load isolator comprising:
      a load current measurement converting current in said load into a measurement voltage;
      a comparator comparing said measurement voltage to a threshold voltage, said comparator having an output, said output activated when said measurement voltage exceeds said threshold voltage;
      a memory activated by said comparator output and producing an activation output for an interval of time;
      a switch coupled between said isolator input and said isolator output, said switch closed when said activation output is asserted;
      wherein any one of said first plurality of current sharing power supplies has sufficient capacity to provide power concurrently to all of said second plurality of loads.

2. The power distribution apparatus of claim 1 wherein said load current measurement includes amplifying a voltage developed across a resistor carrying said load current to produce said measurement voltage.

3. The power distribution apparatus of either claim 1 or claim 2 wherein said load current has a maximum value, and said threshold voltage equals said measurement voltage at said load current maximum value.

4. The power distribution apparatus of either claim 1 or claim 2 wherein said switch comprises a Field Effect Transistor (FET).

5. A power distribution apparatus comprising:
   a shared power bus;
   a first plurality of loads coupled to said shared power bus;
   a second plurality of powering equipment, each of said powering equipment comprising:
      a current sharing power supply having an output;
      a supply isolator having an input coupled to said current sharing power supply output and an output coupled to said shared power bus;
   said supply isolator further comprising:
      a supply current measurement converting current in said supply into a measurement voltage;
      a comparator comparing said measurement voltage to a threshold voltage, said comparator having an output, said output activated when said measurement voltage exceeds said threshold voltage;
      a memory activated by said comparator output and producing an activation output for an interval of time;

a switch coupled between said isolator input and said isolator output, said switch closed when said activation output is asserted;

wherein any one of said second plurality of current sharing power supplies has sufficient capacity to provide power concurrently to all of said first plurality of loads.

6. The power distribution apparatus of claim 5 wherein said supply current measurement includes amplifying a voltage developed across a resistor carrying said supply current to produce said measurement voltage.

7. The power distribution apparatus of either claim 5 or claim 6 wherein said supply current has a maximum value, and said threshold voltage equals said measurement voltage at said maximum value.

8. The power distribution apparatus of either claim 5 or claim 6 wherein said switch comprises a Field Effect Transistor (FET).

9. A power distribution apparatus comprising:

a shared power bus;

a first plurality of powered equipment, each of said powered equipment comprising:
  a load;
  a load isolator having an isolator input coupled to said shared power bus, and an isolator output coupled to said load;

said load isolator comprising:
  a load current measurement converting current in said load into a load measurement voltage;
  a load comparator comparing said load measurement voltage to a load threshold voltage, said load comparator having an output, said output activated when said load measurement voltage exceeds said load threshold voltage;
  a load memory activated by said load comparator output and producing a load activation output for an interval of time;
  a load switch coupled between said load isolator input and said load isolator output, said load switch closed when said load activation output is asserted;

a second plurality of powering equipment, each of said powering equipment comprising:
  a current sharing power supply having an output;
  a supply isolator having an input coupled to said current sharing power supply output and an output coupled to said shared power bus;

said supply isolator further comprising:
  a supply current measurement converting current in said supply output into a supply measurement voltage;
  a supply comparator comparing said supply measurement voltage to a supply threshold voltage, said supply comparator having an output, said output activated when said supply measurement voltage exceeds said supply threshold voltage;
  a supply memory activated by said supply comparator output and producing a supply activation output for an interval of time;
  a supply switch coupled between said supply isolator input and said supply isolator output, said supply switch closed when said supply activation output is asserted;

wherein any one of said second plurality of current sharing power supplies has sufficient capacity to provide power concurrently to all of said first plurality of loads.

10. The power distribution apparatus of claim 9 wherein said load current measurement includes amplifying a voltage developed across a resistor carrying said load current to produce said load measurement voltage.

11. The power distribution apparatus of claim 9 wherein said supply current measurement includes amplifying a voltage developed across a resistor carrying said supply output current to produce said supply measurement voltage.

12. The power distribution apparatus of either claims 9, 10, or 11 wherein said load current has a maximum load value, and said load threshold voltage equals said load measurement voltage at said maximum load value.

13. The power distribution apparatus of either claims 9, 10, or 11 wherein said supply current has a maximum supply output value, and said supply threshold voltage equals said supply measurement voltage at said maximum supply output value.

14. The power distribution apparatus of either claims 9, 10, or 11 where at least one of said load switch or said supply switch is a Field Effect Transistor (FET).

* * * * *